United States Patent [19]

Neuschaeffer et al.

[11] Patent Number: 4,533,393

[45] Date of Patent: Aug. 6, 1985

[54] AQUEOUS CURABLE MOLDING COMPOSITIONS BASED ON INORGANIC INGREDIENTS AND PROCESS FOR THE PRODUCTION OF MOLDED PARTS

[75] Inventors: Karl H. Neuschaeffer, Leichlingen; Paul Spielau, Troisdorf-Eschmar; Günter Zoche, Bonn; Hans-Werner Engels, Troisdorf-Sieglar, all of Fed. Rep. of Germany

[73] Assignee: Dynamit Nobel Aktiengesellschaft, Troisdorf, Fed. Rep. of Germany

[21] Appl. No.: 562,222

[22] Filed: Dec. 16, 1983

[30] Foreign Application Priority Data

Dec. 16, 1982 [DE] Fed. Rep. of Germany ....... 3246604
Dec. 16, 1982 [DE] Fed. Rep. of Germany ....... 3246602
Dec. 16, 1982 [DE] Fed. Rep. of Germany ....... 3246619

[51] Int. Cl.$^3$ .............................................. C09D 5/16
[52] U.S. Cl. .............................. 106/18.12; 106/38.3; 106/38.9; 106/74; 106/84; 252/62; 264/42
[58] Field of Search ................... 106/38.3, 38.35, 38.9, 106/15.05, 18.12, 74, 84; 264/42; 252/62

[56] References Cited

U.S. PATENT DOCUMENTS 1,587,057  6/1926  Winship .
3,920,578 11/1975  Yates ................... 106/38.3
4,316,744  2/1982  Bergna ................. 106/38.35

*Primary Examiner*—Lorenzo B. Hayes
*Attorney, Agent, or Firm*—Antonelli, Terry & Wands

[57] ABSTRACT

Molded parts having high flexural strength, based on alkali silicates, can be produced by casting and/or press-molding and curing by heating from aqueous molding compositions which are prepared from an oxide mixture containing amorphous silicic acid and aluminum oxide, as well as, optionally, as an additional component, aqueous, amorphous, disperse-powdery silicic acid, dissolved $SiO_2$, and alkali from alkali silicate solutions, optionally alkali hydroxide or its aqueous solutions and, if desired, fillers, by means of mixing under agitation. By addition of a blowing agent inorganic foamed products can be obtained.

16 Claims, 3 Drawing Figures

AQUEOUS CURABLE MOLDING COMPOSITIONS BASED ON INORGANIC INGREDIENTS AND PROCESS FOR THE PRODUCTION OF MOLDED PARTS

This invention relates to flowable and/or press-moldable, aqueous molding compositions based on alkali-containing, inorganic ingredients which form molded parts by casting or press-molding in molds and by heating, as well as to the process for manufacturing molded parts from these molding compositions.

It is known to produce flowable aqueous molding compositions synthetically from inorganic compounds and to form molded parts therefrom by curing under heat, the essential ingredients used being alkaline solutions, alkali silicate solutions, metakaolin, as well as optionally certain fillers (French patent application Nos. 79.22041 and 80.18970).

In this connection, quite specific molar ratios of $SiO_2$, of $Al_2O_3$, of the alkali hydroxides, and of water must be maintained, wherein alkaline solutions and alkali silicate serve as the curing agents for a mixture of metakaolin, alkali silicate, and fillers. According to this state of the art, the so-called metakaolin; i.e., a reactive aluminum silicate of the approximate comprehensive formula $Al_2O_3 \cdot 2 SiO_2$, obtained by heating kaolinite to about 800° C., plays a special role as the active component for the formation of a "polymeric" aluminosilicate skeleton. Metakaolin is also the only solid component, apart from any fillers present, and also the sole source for the content of aluminum oxide. The thus-produced molded parts, according to the prior art, exhibit a special, three-dimensional, inorganic polymer skeleton of alkali aluminosilicates.

These molding compositions of the prior art require, after mixing the starting materials together, a considerable aging period; i.e., a waiting period, until casting into the mold and formation of the molded part by heating can be accomplished. Only after aging is it possible to cast these molding compositions, and they then form by heating a solid molded article. These molded articles must, in the normal instance, contain mica powder as the filler in order to avoid crack formation and shrinkage. Another disadvantage resides in that only metakaolin of a quite specific origin, apparently exposed to a quite specific temperature treatment, permits production of the flowable molding composition and such manufacture of the molded parts.

Furthermore, suitable flowable molding compositions are formed only if a specific sequence of addition is maintained during the intermixing of the starting materials.

Therefore, the object resides in avoiding starting materials which are expensive and difficult to procure, eliminating the restriction in the miscibility of the ingredients, replacing, if possible, the expensive mica as the filler, as well as producing more readily processable molding compositions and improved molded parts.

It has been found that these objectives can be attained by using a comparatively small number of raw materials that are easily accessible.

The invention relates to an aqueous, curable; i.e., hardenable, molding composition of inorganic ingredients in flowable or press-moldable distribution optionally with fillers contained therein, characterized in that the molding composition contains, dissolved $SiO_2$; derived from an aqueous solution of alkali silicates and 1.3–10 parts by weight of oxide mixture with contents of amorphous $SiO_2$ and $Al_2O_3$ and/or undissolved $SiO_2$ as amorphous, disperse-powdery, aqueous silicic acid, per part by weight of dissolved $SiO_2$ and 0.7–2.5 parts by weight of $K_2O$ or 0.55–1.5 parts by weight of $Na_2O$, or equivalent amounts of the sodium oxide being used for equivalent amounts of the potassium oxide wherein the $K_2O$ or $Na_2O$ is derived from alkali hydroxide, its aqueous solution and/or an aqueous solution of alkali silicates, per part by weight of dissolved $SiO_2$ as well as a water content sufficient enough to attain flowability or press-moldability, and optionally a filler content up to the limit of flowability.

According to the invention, it is surprisingly unnecessary to provide any metakaolin; i.e., preformed aluminum silicate, as a part of the inorganic polymer skeleton. Rather, it has been discovered that the oxides $SiO_2$ and aluminum oxide of the oxide mixture are capable, in spite of their insolubility in alkalis, of forming an inorganic skeleton structure.

The amorphous $SiO_2$ of the oxide mixture, at least in part, also the aluminum oxide of the oxide mixture and, insofar as present, the undissolved $SiO_2$ of the amorphous, aqueous silicic acid are considered to be the reactive and stone-forming (i.e., hardenable upon being cured), solid components of the molding composition, while the fillers do not actively participate in stone formation. The molded part, cured by heating, is free of water of hydration.

It is true that it is conventional, from U.S. Pat. No. 1,587,057, to grind molten silicic acid (silica) or quartz in particulate form and to stir these ingredients together with solutions of alkali silicate to obtain a paste capable of solidifying, when allowed to stand or upon heating, into molded parts. Thereafter, by a subsequent, time-consuming treatment with concentrated hydrochloric acid, silicic acid is released from the thus-formed silicates, and the excess of hydrochloric acid is eliminated, again by a time-consuming treatment with running water, or is neutralized with the aid of ammonium hydroxide solution, whereupon the part must once more be dried.

The present invention is distinguished thereover by different ingredients and by the direct usability of the alkali-containing molded parts, without any after-treatment. The quantitative ratios can be varied within wide limits and are limited only by the capacity of heat-curing into a stone-hard molded article from the aqueous, castable or press-moldable molding composition. However, under normal circumstances, the molding compositions of this invention are to contain 1.3–7.5 parts by weight, preferably 2–6 parts by weight, very preferably 3.2–5.5 parts by weight of the oxide mixture or $SiO_2$ from amorphous, aqueous silicic acid, and 0.7–2.5 parts by weight, preferably 0.8–1.6, very preferably 0.85–1.4 parts by weight of $K_2O$ or the equivalent amounts thereof; namely, 0.50–1.5, preferably 0.55–1.2 parts by weight of $Na_2O$, or $K_2O$ as well as $Na_2O$ in corresponding, equivalent proportions per part by weight of dissolved $SiO_2$ from alkali silicate solutions.

Insofar as $Na_2O$ is also present besides $K_2O$, the total amount of alkalis, in accordance with their equivalent quantities, is to correspond to the parts by weight indicated for $K_2O$. The undissolved $SiO_2$ stems or is derived from the oxide mixture which contains amorphous $SiO_2$, as well as in some cases from amorphous, disperse-powdery, aqueous silicic acid obtainable, for example, by precipitation.

It is to be understood that, according to the invention, the amount of reactive, i.e., stone-forming ingredients, with their contents of dissolved $SiO_2$, undissolved $SiO_2$, as well as alkali oxide and, on the other hand, the amount of unreactive fillers is restricted merely by the capability of curing from the aqueous, castable or press-moldable molding composition by heating into a stone-like molded part.

The proportion of $K_2O$ and/or $Na_2O$ can stem from alkali silicate solutions, ordinarily called "alkali water glass," or entirely or partially from solid potassium hydroxide and/or sodium hydroxide or solutions thereof.

According to another aspect of the manufacturing process of this invention, the alkali water glass can be obtained entirely or partially by dissolving the amorphous, disperse-powdery, aqueous silicic acid in or with an alkali hydroxide or its aqueous solutions, wherein the undissolved proportion of $SiO_2$ is to be added, in any event, as oxide mixture containing amorphous $SiO_2$ and, if desired, in part as amorphous, disperse-powdery, aqueous silicic acid. The water content of the molding compositions, originating, in the presence of amorphous, disperse-powdery, aqueous silicic acid, from the water content thereof and/or from the moisture thereof, from the water content of the alkali silicate solution, as well as in some cases from alkali hydroxide solutions, if the latter are used, is determined empirically and is not to be higher than required by the flowability of the molding composition or by the pressurized press-molding of press-moldable molding compositions; if necessary, any inert fillers present must also be taken into account with respect to flowability. In general, the water content of the molding composition will amount to 20–65% by weight of water, based on the weight of the active; i.e., stone-forming ingredients, i.e. oxide mixture and/or undissolved aqueous amorphous $SiO_2$ and $K_2O$ and/or $Na_2O$ and dissolved $SiO_2$. In other words, without considering the fillers; in this connection, water contents of 26–58% by weight are preferred. The water content in the molding composition derives partially from the ingredients, i.e. aqueous solution of alkali silicates and from added water. The lower limit and the upper limit for the water content is determined by the curability into stone-like molded parts as well as the press-molding ability. Water contents that are higher than necessary reduce the economy and strength of the molded parts.

The alkali content in the molding composition and in the molded article can be based on a content of $K_2O$ or $Na_2O$, or both alkali oxides. $K_2O$ is preferred as the sole or predominant component, although the alkali content can also be made up entirely of $Na_2O$, but in such a case a longer curing period can occur, and poorer physical properties may be exhibited by the resulting molded parts.

Preferred aqueous solutions of alkali silicates are the conventional, strongly alkaline aqueous solutions of alkali water glass; i.e., of vitreous, water-soluble alkali silicates solidified in melt flow, as they are obtained by melting together quartz sand and alkali carbonates or hydroxides, respectively, in greatly varying quantities of $SiO_2$ and alkali oxide. With molar ratios of 1.5–5 moles of $SiO_2$, preferably 2–4 moles of $SiO_2$, per mole of alkali oxide, customary water glass solutions are 28–43% by weight and customary soda water glass solutions are up to 60% by weight aqueous solutions, wherein the solutions having a lower water content are preferred. According to the invention, an aqueous solution of alkali silicate can also be obtained by dissolving the amorphous, disperse-powdery, aqueous silicic acid in alkali hydroxide solutions or optionally also by adding solid alkali hydroxide with liquefaction under agitation. The amorphous silicic acid frequently forms a solution in an exothermic reaction so that cooling will have to be performed, if necessary, during the production of such an alkali silicate solution. Filtration or purification is unnecessary for use within the scope of the present invention, in spite of the frequently considerable proportions of impurities when using amorphous, aqueous silicic acid. Alkali silicate solutions produced in this way exhibit, though having the same alkali/$SiO_2$ ratio, frequently a different flowability or viscosity than commercial alkali silicate solutions of the type of water glass, probably because the $SiO_2$ is not present as the same type or distribution of oligosilicates. In a surprising and advantageous fashion, the thus-prepared alkali silicate solution exhibits, in spite of the presence of impurities, good properties as an ingredient in the stone-forming molding compositions.

The oxide mixture containing amorphous $SiO_2$ and aluminum oxide has greatly varying contents of both oxides, the combined proportion thereof being frequently 75% to above 90% by weight of oxide mixture, but lower contents than 75% by weight and higher contents of other oxides are also possible. The oxide mixture is free of water; it consists exclusively or quite predominantly of mixtures of oxides.

Such oxide mixtures are produced typically in industrial high-temperature melting processes in the form of dust and initially form a vapor or gaseous phase from which they are deposited as finely divided dust during cooling. Frequently, the oxide mixtures do not correspond to the composition of the industrial melting product.

No indications of crystalline $SiO_2$ are found in the roentgenogram; whereas $Al_2O_3$ is present in crystalline form at least in part as $\alpha$-$Al_2O_3$ (corundum) and in varying proportions as alkali-containing $\beta$-$Al_2O_3$. Iron oxides may be present, for example, as $Fe_2O_3$. Alkaline earths, particularly CaO, are present in some cases in minor amounts. Small proportions of fluorides, $P_2O_5$, or $ZrO_2$ can occur in dependence on the respective melt product.

The oxide mixtures can contain 7–75% by weight of $SiO_2$ and 12–87% by weight of $Al_2O_3$, wherein high $SiO_2$ contents or high $Al_2O_3$ contents may occur, depending on the type of melting process, but also within the same melting process at the beginning or end of a "furnace run".

Suitable oxide mixtures are produced in melting processes during the manufacture of various types of corundum, of mullite, in some cases also in the production of elemental silicon, ferrosilicon, or in metal smelting.

A characterizing factor for the usability of the oxide mixtures according to this invention is insolubility in alkali hydroxide solutions during preparation of the molding composition, and reactivity with an aqueous alkali silicate solution in aqueous molding compositions as a stone-forming ingredient of the molded parts at the curing temperatures.

The amorphous, disperse-powdery, aqueous silicic acid is present as a storable and pourable powder, or filter-moist or as a pasty gel. The water content can be 20–60% by weight or more, if desired, wherein the dry substance is analyzed to contain 85–100% by weight of $SiO_2$, besides especially relatively small proportions of aluminum oxide, iron oxide, metal fluorides, in some instances ammonium fluoride, as well as annealing loss. Such amorphous, disperse-powdery, aqueous silicic acids are generally obtained by precipitation from aqueous solutions, for example, in the winning and purification of mineral starting materials of the aluminum industry, for example, when reacting $H_2SiF_6$ to form alkali fluorides or cryolite, or also from aqueous silicate solutions obtained in some other way. In these amorphous, aqueous silicic acids to be separated in numerous industrial processes, the important factor for the usage described herein is merely that aqueous silicic acids be present; i.e., hydrated, nonoxidic silicic acids in an amorphous, finely divided and, in the described way, reactive form.

Fillers can be contained in the molding composition in amounts of up to 1,000 g, preferably up to 400 g, per 100 g of the stone-forming components; i.e., 10 to 4 parts by weight per part by weight of the stone-forming components. It is highly advantageous that, according to this invention, a very large variety of fillers can be utilized, preferably inorganic compounds in ground-up or distributed form, for example, rock flours, basalts, clays, feldspars, ground mica, ground glass, quartz sand or quartz powder, bauxite powder, hydrated alumina, wastes from the alumina, bauxite, or corundum industry, ashes, slags, fibrous materials, as well as numerous other inert and non-water-soluble mineral as well as optionally organic materials. The fillers form a satisfactory bond with the reactive, stone-forming proportions of the composition, but are not reactants in the actual sense.

Surprisingly, the molding compositions of this invention do not need an aging period after production. Due to the lack of an aging period, it is possible to effect curing to molded parts by heating directly after preparation of the molding composition and shaping; this can be accomplished at a relatively low temperature as compared with the production of ceramics by baking.

The molding compositions, with adequate water contents, are flowable and castable or, with lesser water contents, can be molded with the use of pressure.

In case of flowable molding compositions, initial curing can take place by heating in the mold until an adequate "green strength" has been reached permitting unmolding. The molding compositions of the invention thus advantageously afford a saving in expenses by early removability from the mold, followed optionally by curing under heat until the respectively best physical peroperties have been obtained. Curing of flowable molding compositions in the mold is likewise possible. With press-molded articles manufactured under pressure from press-molding compositions, curing can always take place economically after unmolding.

The temperature of the curing processes and the curing periods are considerably dependent on the composition of the molding material and, in some cases, on the type and amount of fillers. The curing temperatures, however, are at most around 200° C. and thus provide the advantage of an energy saving as compared with numerous traditional products, for example, of construction ceramics.

The curing temperatures generally range from 50° to 200° C. If initial curing is performed in the mold, temperatures of 50°–150° C., preferably 60°–90° C. are required. Unmolding can be followed, if desired, by a further curing step at 80°–200° C. Customary curing periods are between 0.1 and 5 hours. The required pressure exerted during press-molding ranges, depending on the consistency of the molding compositions, from 10 to 500 bar.

Normally, no water loss is incurred during curing. Drying takes place without the aid of technological measures by itself during storage in the air.

Dyeing is possible and is not subject to any limitations because of the low temperature during curing.

Therefore, another object of this invention resides in processes for the production of molded parts from the molding compositions of this invention.

The molding compositions are prepared by stirring the solid ingredients into the liquid ingredients; during this step, thorough intermixing must be ensured with the aid of an agitator, optionally by kneading. If required, the solid ingredients are added in pulverized form in portions or over a relatively long period of time, and homogeneously distributed. The components can be mixed together in any desired sequence.

Due to the curing process, the molded parts reach flexural strengths at break according DIN 53452 ranging from 250 to 350 $kg/cm^2$ or, in some cases, higher values; i.e., values as have heretofore been attainable only by the expensive procedures in the manufacture of ceramic plates or clinkers and/or in case of slate plates. The compressive strength of the molded parts is high.

The molded parts provide a very high dimensional trueness and accurately represent every detail of the mold so that even very thin molded parts, predetermined surface textures, recesses, and undercut zones can be reproduced with dimensional accuracy.

Tendency to crack formation and mold shrinkage are very low so that, in particular, also articles with large dimensions and large-area, respectively flat molded parts can be manufactured.

The molded parts can be drilled and, if desired, lend themselves to subsequent machining of the surface, for example, by grinding, milling, or polishing. These properties make it possible to utilize the molded parts for numerous technical purposes heretofore reserved for highly heated, for example, ceramic, molded parts. A further usage resides in the capacity of high-quality molded parts in building construction, for example, as panels for the facing and/or construction of walls or for roof coverings, for example, in the way of slate panels, clinkers, linings, or similar articles; in contrast to conventional materials, it is possible to utilize even thin molded parts of dimensions larger than heretofore, especially due to the high flexural strength, for example, facing elements having the size of several slate panels, clinkers, or the like.

It has, moreover, been found that, by adding blowing agents, especially gas-releasing agents liberating a gas at temperatures of between 20° and 95° C., lightweight, foamed molded articles can be produced in a simple and economical fashion.

The invention, likewise, relates to foamable, aqueous curable molding compositions of inorganic components with proportions of fillers optionally contained therein, consisting of 1.3–10 parts by weight of an oxide mixture containing amorphous $SiO_2$ and aluminum oxide and 0.7–2.5 parts by weight of $K_2O$ or 0.55–1.5 parts by weight of $Na_2O$ per part by weight of dissolved $SiO_2$, with water contents and, if desired, filler contents up to the limit of flowability, and blowing agents, wherein the oxide mixture is optionally replaced by $SiO_2$ from amorphous, disperse-powdery, aqueous silicic acid, $K_2O$ or $Na_2O$ stemming from alkali hydroxide, the aqueous solution thereof and/or from an aqueous solution of alkali silicates, and dissolved $SiO_2$ from an aqueous solution of alkali silicates.

Only negligible shrinkage takes place during curing. The molded article affors an exact reproduction of the mold.

According to the invention, foamed molded parts with high temperature stability of up to 800°, 1,000°, or even 1,200° C. can be produced from aqueous, foamable inorganic molding compositions in dependence on the type and amount of added filler.

Suitable blowing agents are compounds forming a sufficient amount of gases at the temperature increase necessary for curing, or under the effect of the water. The type and quantity of blowing agents is selected so that gas evolution has ceased upon elevation of the temperature for curing purposes, before the molded part is solidified to its permanent shape by the onsetting curing process.

Therefore, the gas-forming blowing agents are to release the gas serving for the foaming process at or above room temperature and/or at or above the temperature prevailing on account of the production of the molding compositions and below the curing temperature to be employed. In general, the temperature of the gas formation of the blowing agents is to range between 20° and 95° C.

It is, furthermore, possible to produce foamed molded parts by the direct addition of gases, such as $N_2$, air, into the composition. In this procedure, the gases must be finely distributed by adding emulsifiers, for example, wetting agents, and in some cases, the foam must be stabilized by suitable materials until it has been cured. Such materials are, for example, suitable thickeners.

Gas-forming blowing agents are especially the so-called sodium perborate, an addition compound from sodium borate and hydrogen peroxide, or aluminum powder, in stabilized or unstabilized form.

The amount of blowing agents greatly depends on the density of the foamed article, the strength to be attained for such article, and the type of blowing agent. Suitable quantities of the perborate range between 0.5 and 4% by weight, preferably 0.7–3.4% by weight of the molding composition. Suitable amounts of aluminum powder, yielding a large quantity of hydrogen gas per weight unit, range between 0.05 and 0.8% by weight, preferably 0.1–0.6% by weight of the molding composition. With all blowing agents, smaller or larger amounts are, likewise, possible for special purposes. The aluminum powder stabilized with a surface film which cannot be attacked at normal temperature foams at temperatures of, for example, 60°–90° C. If the onset of foaming at low temperatures doesnot constitute an impediment, it is possible to utilize unstablized aluminum powder.

Other gas-forming blowing agents can be utilized, such as inorganic or organic peroxides decomposing under the effect of water and/or heating during curing, persulfate or percarbonates, $H_2O_2$, other peroxy compounds, or the like. The foaming periods can be greatly affected by the type and amount of blowing agent, ranging from 10 minutes to 3 hours, but long foaming periods are required only in case of large molded parts, the interior of which heats up only gradually during the curing step.

If desired, it is also possible to introduce gases, such as $N_2$, air, and others, and distribute same by agitation and by means of emulsifiers, for example.

The molding compositions of this invention surprisingly require no aging period after mixing. Because of the missing aging period, it is possible to cure the molded parts by heating immediately after preparation of the molding composition and shaping.

The water content need only be of such an amount that sufficient flowability is obtained. In case of foamable molding compositions, foaming and simultaneously or subsequently initial curing in the mold by further heating are conducted until adequate strength has been attained making unmolding possible. The molding compositions of the invention,in some cases, permit early unmolding and subsequent curing under heat. Preferably, curing takes place in the mold.

The temperature of the curing processes and the curing periods are dependent on the ingredients of the molding composition, the type of blowing agent, and, in certain cases, on the type and quantity of the fillers. The curing temperatures, however, are maximally 200° C. and, thus, afford the advantage of saving energy as compared with numerous traditional products, for example, of the construction ceramics.

The temperatures for curing range generally between 50° and 200° C. Initial curing in the mold demands temperatures of 50°–150° C., preferably 60°–95° C. As long as foaming takes place during initial curing, and the molded part has not as yet formed the final configuration, a temperature is to be maintained at which no steam can be formed. After unmolding, curing can follow at 70°–200° C., preferably 80°–160° C. Usual curing periods are between 0.1 and 3 hours.

The mold preferably is filled only to such an extent that the foamed, solid molded part completely fills out the mold; this can be determined by preliminary test. Since very little shrinkage only occurs during curing, all of the details of the mold can be accurately reproduced in the molded part. Drying takes place without the aid of technical measures by itself during storage in the air or at an elevated temperature.

Dyeing can be performed and is not subject to any limitations, due to the low temperature during curing. The dyes are to be resistant against the blowing agents and against alkali.

The processing for the production of the molded parts according to this invention is variable.

The components can be mixed together in any desired sequence. The solid ingredients and the liquid ingredients are thoroughly mixed with the aid of an agitator or optionally by kneading. If necessary, the solid ingredients are added in pulverized form in portions or over a relatively long period of time and distributed homogeneously. In case of a foamable molding composition, the blowing agents are incorporated only shortly before casting of the molding composition.

The foamable molding compositions are prepared especially advantageously with a weight ratio of oxide mixture to alkali silicate solution of 0.5:1 to 3:1. The alkali silicate solution is preferably produced from amorphous, aqueous silicic acid.

The molded parts, due to the curing process, exhibit a high temperature stability up to 1,000° C., in part up to 1,200° C.; i.e., values as heretofore obtainable only by the expensive processes during the manufacture of ceramic plates or clinkers and/or in case of natural stone.

The foamed articles have densities of 100–1,000, preferably 200–800 kg/m³.

Within the scope of this invention, the molded parts can consist entirely or partially of foam material. In particular, the molded parts can consist of a flat, foamed part and a flat, solid part constituting, for example, the visible side. The solid part can be made of any desired material, such as a ceramic, natural or artificial stone, metal, or synthetic resins. Preferably, the solid part consists of clay or ceramic compositions, such as floor tiles or wall tiles, or clinkers, of natural stone or artificial stone, or it is made of a molding composition of this invention without or with a small amount of blowing agent, on which a cast-on foamed component is firmly anchored. If necessary, additional anchoring action can be provided by profiles, ridges, or the like on the solid part. If the foamed part shows inadequate adhesion, gluing can also be provided. The foamed part can be cast onto the finished solid part resting in the mold.

Simultaneous production—wet in wet—of the foamed part and the solid part is possible in case of curable solid parts, especially if the latter are made of molding compositions with the ingredients according to this invention, leaving out the blowing agents.

The molded parts possess very high dimensional trueness. Tendency to form cracks and to shrink in the mold is very low so that, in particular, also molded parts having large dimensions and large-area foam backings can be produced.

The molded parts can be drilled or sawed and, insofar as desired, permit subsequent machining of the surface, for example, by grinding or milling.

These properties make it possible to use the molded parts for numerous technical purposes heretofore reserved for highly heated, for example, ceramic, molded parts. A further usage resides in the form of high-quality molded articles in the building construction, for example, as panels for the facing and/or construction of walls, or for roof coverings, for example, in the form of panels, clinkers, linings, or similar articles; in contrast to conventional meaterials, it is possible to utilize even thin molded parts of dimensions larger than heretofore, especially on account of the high flexural strength, for example, facing elements having the size of several panels, clinkers, or the like.

The foamed articles can be advantageously used as thermal insulating and noise damping elements and can be readily machined, if necessary, for example, by sawing.

In the accompanying drawings, the molded parts of this invention produced from the molding compositions are shown schematically by way of example and will be hereinafter described in greater detail with reference to the drawings wherein.

Figure 1:
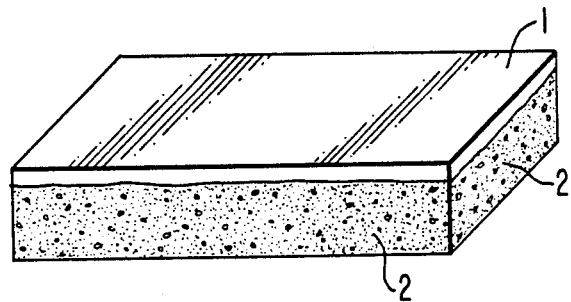
FIG. 1 shows a rectangular molded part made up of a solid cover layer and a foam layer bonded thereto.

The molded part of FIG. 1, shown in perspective view, comprises a solid, unfoamed cover layer 1 of an inorganic molding composition and a foam layer 2 formed by casting a foamable molding composition within the same mold; after curing, this foam layer is firmly joined or bonded to the solid cover layer.

Figure 2:
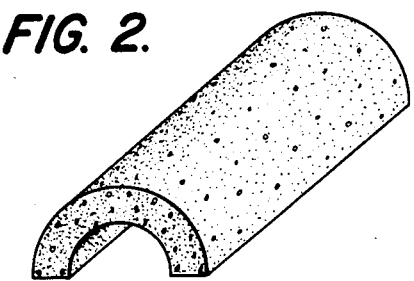
FIG. 2 shows a foamed part in the form of a semicylinder usable, for example, for pipe insulating.

FIG. 2 shows a foamed article in the form of a semicylinder usable, in conjunction with a second, identical semicylinder, as a casing-type heat insulation, for example, for a pipe or a boiler.

Figure 3:
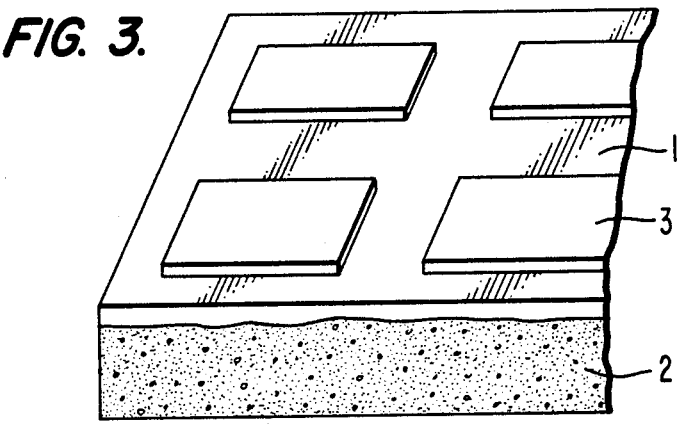
FIG. 3 shows a rectangular molded part made up of a cover layer provided with a raised relief and a heat-insulating foam layer produced by casting a foamable molding composition onto the cover layer.

FIG. 3 shows a rectangular molded part made up of a foam layer 2 and a solid cover layer 1, which has on the visible side a profiling 3 raised from the surface. Such a part can be produced, for example, from a prefabricated ceramic member representing the cover layer 1 with profiling, by casting a foamable molding composition on the ceramic member and curing into a foamed part.

The invention will be further understood from the following examples:

EXAMPLES

The following starting materials were utilized in the examples for casting compositions and press-molding compositions:

Potassium silicate solution I (potassium water glass): 26.6% by weight of $SiO_2$; 14.5% by weight of $K_2O$; and 58.9% by weight of $H_2O$.

Potassium silicate solution II (potassium water glass): 25.0% by weight of $SiO_2$; 13.6% by weight of $K_2O$ and 6.14% by weight of $H_2O$.

Sodium silicate solution (soda water glass): 29.2% by weight of $SiO_2$; 8.8% by weight of $Na_2O$; and 62.0% by weight of $H_2O$.

Aqueous disperse powdery silicic acids:

TABLE 1

|  | I | II |
|---|---|---|
| $SiO_2$ % by weight | 40.5 | 45.0 |
| $H_2O$ % by weight | 54.1 | 50.1 |
| $NH_3$ % by weight | 4.0 | 4.2 |
| $F^-$ % by weight | 1.0 | 0.6 |
| Others % by weight | 0.4 | 0.1 |

TABLE 2

| % by Wt. | Oxide mixtures containing amorphous $SiO_2$: | | | | | | |
|---|---|---|---|---|---|---|---|
|  | III | IV | V | VI | VII | VIII | IX |
| $SiO_2$ | 24.5 | 22.9 | 22.6 | 32.9 | 9.4 | 71.8 | 7.4 |
| $Al_2O_3$ | 64.2 | 68.0 | 59.2 | 60.4 | 78.1 | 14.2 | 85.7 |
| $Fe_2O_3$ | 3.3 | 5.0 | 3.2 | 0.2 | 2.6 | 3.8 | 0.3 |
| $Na_2O$ | 1.5 | 2.5 | 3.9 | 2.6 | 4.3 | 1.8 | 3.3 |
| $K_2O$ | 0.6 | 0.3 | 0.5 | 0.1 | 0.7 | 1.2 | 0.6 |
| Annealing Loss | 2.4 | 1.1 | 3.2 | 2.9 | 1.3 | 2.7 | 2.1 |
| Remainder | 3.5 | 0.2 | 7.4 | 0.9 | 3.6 | 4.5 | 0.6 |

EXAMPLES 1–8 (CASTING COMPOSITIONS)

Castable molding compositions were produced from the above components, by dissolving KOH in alkali water glass under agitation, cooling the mixture to room temperature, and intensively mixing this mixture with a dry premix of the oxide mixture, the fillers and, optionally, aqueous, amorphous silicic acid, with the aid of a vibrating stirrer. The resultant thixotropic molding composition forms, under vibration, a castable mass which, under vibration, was filled into molds.

The molds filled with the casting composition were cured at 80° C. for 2 hours in a moist atmosphere. Then unmolding was effected (i.e., the molded product was removed from the mold) and the product dried in the air.

Flexural strength at break (DIN 51 030) was measured after curing and three days of drying in air.

The molded parts were free of cracks, exhibited no shrinkage, and showed an exact reproduction of even small details of the molds utilized.

EXAMPLE 9 (PREPARATION OF POTASSIUM WATER GLASS)

Using 567 g of KOH (89.6% by weight g), 346 g of water, and 920 g of an amorphous, disperse-powdery, aqueous silicic acid of the aforementioned composition II, the silicic acid is made into 1.8 kg of potassium silicate solution having the composition of 23.7% by weight of $K_2O$, 23.2% by weight of $SiO_2$, and 52.8% by weight of $H_2O$ by dissolving the KOH in the indicated amount of water under spontaneous heating and with the addition of the indicated amount of silicic acid in incremental portions within one hour under agitation and heating to 110° C.

The result is a somewhat brownish, slightly turbid solution. The thus-produced potassium water glass is utilized in place of commercially available potassium water glass of Examples 1–8. The proportions of each ingredient and flexural strengths obtained are given in the following Table:

TABLE 3

| Parts by Wt. | 1 | 2 | 3 | 4 | 5 | 6 | 7 | 8 |
|---|---|---|---|---|---|---|---|---|
| Potassium silicate solution I | 50 | — | 50 | 50 | 50 | — | 50 | 50 |
| Potassium silicate solution II | — | 55 | — | — | — | — | — | — |
| Sodium silicate solution | — | — | — | — | — | 50 | — | — |
| KOH solution 50% by weight in $H_2O$ | 12.5 | 12.5 | 12.5 | 12.5 | 12.5 | — | 12.5 | 21 |
| NaOH solution 50% by weight in $H_2O$ | — | — | — | — | — | 10 | — | — |
| $SiO_2$ oxide mixture III | — | — | 70 | — | — | — | 70 | — |
| $SiO_2$ oxide mixture IV | 70 | 60 | — | — | — | 35 | — | — |
| $SiO_2$ oxide mixture V | — | — | — | — | 90 | — | — | — |
| $SiO_2$ oxide mixture VI | — | — | — | — | — | — | — | 60 |
| $SiO_2$ oxide mixture VII | — | — | — | 50 | — | — | — | — |
| Quartz sand, grain size dia. 0.2 mm | 134 | — | 99 | 160 | 104 | 183 | — | 138 |
| Quartz flour, grain size dia. <40 μm | 40 | — | 30 | 48 | 31 | 55 | — | 41 |
| Kaolin, dry, ground | — | 72 | — | — | — | — | — | — |
| Clay, dry, ground | — | — | 40 | — | 25 | — | 25 | — |
| Basalt sand, grain size dia. 0.09–0.6 mm | — | — | — | — | — | — | 146 | — |
| Basalt, ground, grain size dia. <0.09 mm | — | — | — | — | — | — | 44 | — |
| Flexural strength (kg/cm²) | 270 | 220 | 230 | 180 | 230 | 200 | 110 | 150 |

TABLE 4

| Parts by Wt. | 10 | 11 | 12 | 13 | 14 | 15 | 16 | 17 |
|---|---|---|---|---|---|---|---|---|
| Potassium silicate solution, Example 9 | 50 | 50 | 50 | 50 | 50 | 50 | 50 | 50 |
| KOH solution 50% by wt. in $H_2O$ | — | — | — | — | — | 8 | — | 2 |
| $SiO_2$ Oxide mixture III | 50 | 50 | — | — | — | — | 40 | — |
| $SiO_2$ Oxide mixture IV | — | — | 45 | — | — | — | — | — |
| $SiO_2$ Oxide mixture VI | — | — | — | — | — | — | — | 55 |
| $SiO_2$ Oxide mixture VII | — | — | — | 50 | — | — | — | — |
| $SiO_2$ Oxide mixture VIII | — | — | — | — | 50 | — | — | — |
| $SiO_2$ Oxide mixture VIII | — | — | — | — | — | 40 | — | — |
| $SiO_2$ Oxide mixture IX | — | — | — | — | — | 40 | — | — |
| Aqueous, disperse silicic acid I | — | — | — | — | — | — | 10 | — |
| Quartz sand, grain size dia. 0.2 mm | — | — | 69 | 81 | 76 | 139 | 92 | 44 |
| Quartz sand, grain size dia. <40 μm | — | — | 20 | 25 | 23 | 41 | 28 | 13 |
| Kaolin, dry, ground | — | 29 | — | — | — | — | — | — |
| Basalt, ground, grain size dia. <0.09 mm | 54.5 | — | — | — | — | — | — | — |
| Flexural strength (kg/cm²) | 230 | 200 | 240 | 180 | 290 | 260 | 350 | 330 |

EXAMPLES 18–21 (PRESS-MOLDING COMPOSITIONS)

The press-molding composition was produced in accordance with the description of Examples 1–8, but the product was a moist powder which does not become castable by vibration. The powder is filled into molds and pressed into panels having a thickness of 10 mm under a pressure of 240 bar. The thus-molded panels are unmolded without curing and cured for 2 hours at 80° C. The molded parts are free of cracks and true to the mold, and they can be drilled and cut by means of a cutting wheel without splintering of the edges.

TABLE 5

| Parts by Weight | 18 | 19 | 20 | 21 |
|---|---|---|---|---|
| Potassium silicate solution I | 50 | — | — | — |
| Potassium silicate solution, Example 9 | — | — | — | — |
| KOH solution 50% in $H_2O$ | 10 | 4 | — | — |
| $SiO_2$ oxide mixture IV | 60 | 60 | 60 | 60 |
| Quartz sand, grain size dia. 0.2 mm | 308 | — | — | — |
| Quartz flour, grain size dia. <40 μm | 92 | — | — | 145 |
| Kaolin, dry, ground | — | 128 | — | — |
| Clay, dry, ground | — | — | 110 | — |
| Flexural strength (kg/cm²) | 150 | 130 | 160 | 180 |

EXAMPLES 22-30

The starting materials set out hereinafter were utilized in the following examples for casting compositions and press-molding compositions:

Potassium silicate solution I (potassium water glass): 26.6% by weight of $SiO_2$; 14.5% by weight of $K_2O$; and 58.9% by weight of $H_2O$.

Potassium silicate solution II (potassium water glass): 25.0% by weight of $SiO_2$; 13.5% by weight of $K_2O$; and 61.4% by weight of $H_2O$.

Sodium silicate solution (soda water glass): 29.2% by weight $SiO_2$; 8.8% by weight of $Na_2O$; and 62.0% by weight of $H_2O$.

TABLE 6

| % by Weight | Aqueous disperse silicic acids | | |
|---|---|---|---|
| | I | II | III |
| $SiO_2$ | 40.5 | 45.0 | 39.3 |
| $H_2O$ | 54.1 | 50.1 | 56.5 |
| $NH_3$ | 4.0 | 4.2 | — |
| $F^-$ | 1.0 | 0.6 | 1.7 |
| $Al_2O_3$ | — | — | 2.4 |
| Others | 0.4 | 0.1 | 0.1 |

EXAMPLES 22-24 (CASTING COMPOSITIONS)

Castable molding compositions were produced from the following components, by dissolving the KOH in alkali water glass under agitation, cooling the mixture to room temperature, and thoroughly mixing the mixture with a dry premix from aqueous, disperse silicic acid and the fillers with the aid of a vibration stirrer. The resultant, crumbly molding composition forms, under vibration, a castable mass which was filled into molds under vibration.

The molds, filled with the casting composition, were initially cured at 80° C. for 2 hours by heating, thus attaining a "green strength" permitting unmolding. Then the final curing step was performed at 200° C. for one hour.

TABLE 7

| Parts by Weight | Example | | |
|---|---|---|---|
| | 22 | 23 | 24 |
| Potassium silicate solution I | 31 | 31 | — |
| Potassium silicate solution II | — | — | 33.5 |
| KOH solid (84.8% by weight g) | 10 | 10 | 10 |
| Aqueous, disperse silicic acid III | 61 | 61 | 61 |
| Quartz sand, grain size dia. 0.2 mm | 301 | — | — |
| Quartz flour, grain size dia. below 40 μm | 91 | 125 | 250 |
| Bauxite, ground | — | 5 | — |
| Flexural strength (kg/cm$^2$) | 271 | 320 | 268 |

The flexural strength at break was measured after curing and increases even further after drying in air.

The molded parts were free of cracks, exhibited no shrinkage, and showed an accurate reproduction of even small details of the molds utilized.

EXAMPLES 25-27 (PRESS-MOLDING COMPOSITIONS)

TABLE 8

| Parts by Weight | Example | | |
|---|---|---|---|
| | 25 | 26 | 27 |
| Potassium silicate solution I | 93 | 93 | 93 |
| KOH solid (84.5% by weight g) | 30 | 30 | 30 |
| Aqueous, disperse silicic acid I | — | 130 | — |
| Aqueous, disperse silicic acid II | — | — | 150 |
| Aqueous, disperse silicic acid III | 91 | — | — |
| Ground glass (soda glass) 80-150 μm | 174 | — | 100 |
| Mica, ground, grain size below 0.2 mm | 300 | 400 | 50 |
| Hydrated alumina | 92 | — | — |
| Flexural strength (kg/cm$^2$) | 311 | 301 | 280 |

The press-molding composition was prepared in accordance with the data in Examples 22-42, but a moist powder was produced which does not become castable by vibration. The powder is filled into molds and pressed into panels having a thickness of 10 mm under a pressure of 240 bar. The thus-pressed panels are unmolded without curing and cured at 100° C. for 10 hours. The molded parts are free of cracks and true to dimensions, and can be drilled and cut by means of a cutting wheel without splintering of the edges.

EXAMPLE 28

Analogously to Example 22, with the difference that the potassium silicate solution I and the KOH in the solid phase were replaced by 40 parts by weight of the potassium silicate solution from Example 9.

EXAMPLE 29

Analogously to Example 25, with the difference that the potassium silicate solution I was replaced by 100 parts by weight of the aforementioned soda water glass, and curing took place at 200° C. for 7 hours.

EXAMPLE 30

200 g of a potassium-alkaline solution of aqueous, amorphous silicic acid, containing 53% by weight of $H_2O$, 23.5% by weight of $SiO_2$, and 23.5% by weight of $K_2O$ are mixed homogeneously with 400 g of an oxide mixture containing 46% by weight of amorphous $SiO_2$ and 43% by weight of $Al_2O_3$ as well as $Fe_2O_3$ and further oxides and, as the blowing agent, 15 g of $NaBO_2 \cdot H_2O_2 \cdot 3H_2O$, and poured into a mold of a suitable volume which can be closed all around. The closed mold is heated to about 80° C., whereby oxygen is released and converts the composition into a foam. The molded part is cured within 30 minutes and can be unmolded. The thus-molded foamed article is dried for another 30 minutes at temperatures of 90° C. The density of the open-pore foam is 450 kg/m$^3$.

EXAMPLE 31

A mixture as described in Example 30 is cast onto the rear side of a ceramic tile, which latter has been inserted in a corresponding mold, and cured as described in Example 30. After unmolding, the foam has turned into a solid composite material with the absorbent rear side of the tile, this material exhibiting the decorative face of the tile and a thermal- and noise-insulating rear side.

EXAMPLE 32

70 g of a potassium-alkaline solution of amorphous silicic acid, containing 51% by weight of $H_2O$ with $SiO_2/K_2O$ molar ratio of 2:1, is intensively mixed with 70 g of an oxide mixture containing 56% by weight of amorphous $SiO_2$, 37% by weight of $Al_2O_3$ as well as $Fe_2O_3$ and further oxides, and as the fillers 120 g of quartz sand, 40 g of quartz flour, and 3 g of coloring pigment based on $Fe_2O_3$, and this mixture is poured into an iron mold provided with a texturized surface. Immediately thereafter, 250 g of the same potassium-alkaline solution of amorphous silicic acid is thoroughly mixed with 250 g of the aforementioned oxide mixture, 60 g of finely ground perlite, and 10 g of $NaBO_2.H_2O_2.H_2O$, and poured into the composition, free of blowing agent, in the same mold. After closing of the mold, the latter is heated to 85° C. and reopened after 45 minutes. The resultant molded part is then dried for one hour at 90° C. The part consists of a dyed solid front face texturized on the visible side, and a rear face consisting of inorganic foam having a density of 350 kg/m³ while the solid part has a density of 1700 kg/m³.

EXAMPLE 33

This Example is carried out in correspondence with Example 32 with the molding compositions described therein, but with the difference that the solid composition is cast and cured in texturized multiple-compartment molds before using the foaming composition in a second working step for forming a foam backing on the already cured, solid molded parts. In a version (a), the multiple-compartment mold contains solid molded parts, separated from one another by ridges in the mold, which are joined together by the foam, are removed in combination from the mold, and constitute a single molded part to be utilized. In a version (b), several molded parts are cast, but each of these has a solid, texturized front face and a rear face consisting of foam.

EXAMPLE 34

150 g of a potassium-alkaline solution of amorphous aqueous silicic acid, containing 48% by weight of $H_2O$, with a $SiO_2/K_2O$ molar ratio of 1.5:1, is mixed with 250 g of an oxide mixture containing 70% by weight of amorphous $SiO_2$ and small contents of $Al_2O_3$ and further oxides and, as the blowing agent, 0.5 g of pulverized aluminum (desensitized with the calcium salt of a fatty acid) and poured into a mold. After closing the mold except for a small bleeder opening (for the escape of excess amounts of gas), the composition is foamed and cured within 10 minutes by heating to 80° C. After unmolding, the product is dried at 80° C. The thus-produced foam has a density of 380 kg/m³.

EXAMPLE 35

200 g of a potassium-alkaline solution of amorphous silicic acid, containing 52% by weight of water and with a $SiO_2/K_2O$ molar ratio of 2.2:1, and 200 g of an oxide mixture containing 20% by weight of amorphous $SiO_2$, 60% by weight of $Al_2O_3$ and further oxides, as well as 0.5 g of unstabilized aluminum powder are mixed together and immediately thereafter poured into a mold. By the reaction of the aluminum with the alkali, foam formation and solidification are effected at the same time under heating; by a subsequent heating step at 60° C., an unmoldable foamed article is obtained after 10 minutes. This article is further dried in the air.

EXAMPLE 36

22.5 g of aqueous, amorphous silicic acid, containing 50% by weight of $SiO_2$, 17.5 g of 90% by weight KOH, and 30 g of water are boiled and, after cooling, mixed with 100 g of quartz flour as the filler, 20 g of 50% by weight KOH solution, 71 g of aqueous, amorphous silicic acid containing 50% by weight of $SiO_2$, and 14.5 g of $NaBO_2.H_2O_2.3H_2O$, poured into a mold, and cured for 90 minutes at 85° C. After unmolding, the resultant foamed article is heated for 30 minutes at 85° C.

What is claimed is:

1. An aqueous, hardenable molding composition consisting essentially of inorganic components and water in a flowable or press-moldable distribution, said inorganic components comprising stone-forming components consisting of:

dissolved $SiO_2$;

1.3–10 parts by weight of a water-free oxide mixture containing amorphous $SiO_2$ and aluminum oxide per part of dissolved $SiO_2$;

0.7–2.5 parts by weight of $K_2O$ or 0.55–1.5 parts by weight of $Na_2O$ per part by weight of dissolved $SiO_2$ or equivalent amounts of the sodium oxide being used for equivalent amounts of the potassium oxide; wherein $K_2O$ or $Na_2O$, respectively, is derived from at least one alkali hydroxide selected from the group consisting of sodium hydroxide and potassium hydroxide, an aqueous solution thereof, or an aqueous solution of at least one alkali silicate selected from the group consisting of sodium silicate and potassium silicate, and the dissolved $SiO_2$ is derived from an aqueous solution of at least one alkali silicate selected from the group consisting of sodium silicate and potassium silicate; said composition containing sufficient amounts of water up to attainment of flowability or press-moldability, respectively, and optionally amounts of inert fillers up to the limit of flowability.

2. A molding composition according to claim 1, wherein the aqueous solution of the at least one alkali silicate from which the dissolved $SiO_2$ is derived is produced entirely or partially by dissolving amorphous, disperse-powdery, aqueous silicic acid in at least one alkali hydroxide selected from the group consisting of sodium hydroxide and potassium hydroxide or aqueous solutions thereof.

3. A molding composition according to claim 1, wherein said composition further contains gas-forming blowing agents with a gas-forming temperature of between 20° and 95° C.

4. A molding composition according to claim 3, wherein said blowing agents comprise sodium perborate or pulverized aluminum.

5. A molding composition according to claim 4, wherein said composition contains 0.5–4% by weight of sodium perborate, based on the total weight of the molding composition.

6. A molding composition according to claim 4, wherein said composition contains 0.05–0.8% by weight of pulverized aluminum, based on the total weight of the molding composition.

7. A molding composition according to claim 1, wherein said composition contains from 20 to 65% by weight of water based on the total weight of the reactive stone-forming components of said composition.

8. A molding composition according to claim 1, wherein the composition contains up to 1,000 grams of inert fillers per 100 grams of the reactive stone-forming components of said composition.

9. A molding composition according to claim 1, wherein said oxide mixture contains 7–75% by weight of $SiO_2$ and 12–87% by weight of $Al_2O_3$; the $Al_2O_3$ being present in a crystalline form.

10. A process for the production of molded parts from molding compositions which comprises preparing a flowable or press-moldable composition containing 1.3–10 parts by weight of a water-free oxide mixture with contents of amorphous $SiO_2$ and aluminum oxide and 0.7–2.5 parts by weight of $K_2O$ or 0.55–1.5 parts by weight of $Na_2O$ per 1 part by weight of dissolved $SiO_2$ or equivalent amounts of the sodium oxide being used for equivalent amounts of the potassium oxide, as well as optionally inert fillers, by
   (a) mixing the oxide mixture containing silicon dioxide and aluminum oxide into an aqueous solution of at least one alkali silicate selected from the group consisting of sodium silicate and potassium silicate which alkali silicate solution is admixed, with at least one solid or dissolved alkali hydroxide selected from the group consisting of sodium hydroxide and potassium hydroxide; or
   (b) dissolving amorphous, aqueous silicic acid in an aqueous solution of at least one alkali hydroxide selected from the group consisting of sodium hydroxide and potassium hydroxide to obtain an aqueous silicate solution thereof, and adding the oxide mixture, or
   (c) mixing amorphous, aqueous silicic acid with at least one alkali hydroxide selected from the group consisting of sodium hydroxide and potassium hydroxide or its aqueous solution, and reaction of the proportion of silicic acid to be dissolved to the resulting alkali silicate solution, and adding the oxide mixture, and filling this composition into molds, venting, optionally press-molding, and curing.

11. A process for the production of molded parts from molding compositions according to claim 3, which comprises preparing a flowable composition containing 1.5–10 parts by weight of a water-free oxide mixture with contents of amorphous $SiO_2$ and aluminum oxide and 0.7–2.5 parts by weight of $K_2O$ or 0.55–1.5 parts by weight of $Na_2O$ per 1 part by weight of dissolved $SiO_2$ or equivalent amounts of the sodium oxide being used for equivalent amounts of the potassium oxide, a blowing agent, as well as optionally inert fillers; by
   (a) mixing the oxide mixture containing amorphous $SiO_2$ and aluminum oxide into an aqueous solution of at least one alkali silicate selected from the group consisting of sodium silicate and potassium silicate which is optionally admixed with at least one solid or dissolved alkali hydroxide selected from the group consisting of sodium hydroxide and potassium hydroxide; or
   (b) dissolving amorphous, aqueous silicic acid in an aqueous solution of at least one alkali hydroxide selected from the group consisting of sodium hydroxide and potassium hydroxide to obtain an aqueous silicate solution and adding the oxide mixture; or
   (c) mixing amorphous, aqueous silicic acid with at least one alkali hydroxide selected from the group consisting of sodium hydroxide and potassium hydroxide or its aqueous solution, and reaction of the proportion of silicic acid to be dissolved to silicate solution, and adding the oxide mixture; and filling the composition into a mold, foaming and curing.

12. A process according to claim 10, wherein prior to adding the other components of the molding composition, an alkali silicate solution is prepared by dissolving amorphous, aqueous silicic acid in alkali hydroxide or its solutions.

13. A process according to claim 12, wherein curing the molding composition that has been charged into a mold is effected at temperatures of 50° to 200° C.

14. A process according to claim wherein initial curing is effected at 50°–150° C. unmolding is effected after attaining the required solidity, and thereupon final curing is effected at 80°–200° C.

15. A process according to claim 10, wherein said oxide mixture contains 7–75% by weight of $SiO_2$ and 12–87% by weight of $Al_2O_3$; the $Al_2O_3$ being present in a crystalline form.

16. A process according to claim 11, wherein said oxide mixture contains 7–75% by weight of $SiO_2$ and 12–87% by weight of $Al_2O_3$; the $Al_2O_3$ being present in a crystalline form.

* * * * *

UNITED STATES PATENT AND TRADEMARK OFFICE
CERTIFICATE OF CORRECTION

PATENT NO. : 4,533,393

DATED : Aug. 6, 1985

INVENTOR(S) : NEUSCHAEFFER et al.

It is certified that error appears in the above-identified patent and that said Letters Patent is hereby corrected as shown below:

Column 5, line 53, cancel "peroperties" and insert --properties--.
Column 7, line 8, cancel "affors" and insert --affords--; line 58, cancel "unstablized" and insert --unstabilized--.
Column 14, line 20, cancel "22-42" and insert --22-24--.
Claim 14, line 1, after "claim" insert --13--.

Signed and Sealed this

Twenty-seventh Day of May 1986

[SEAL]

Attest:

DONALD J. QUIGG

Attesting Officer

Commissioner of Patents and Trademarks